United States Patent
Asami et al.

(10) Patent No.: US 7,731,629 B2
(45) Date of Patent: Jun. 8, 2010

(54) CONTROL APPARATUS FOR VEHICLE AND METHOD OF CONTROLLING VEHICLE

(75) Inventors: Tomohiro Asami, Nisshin (JP); Toshio Sugimura, Nagoya (JP); Takaaki Tokura, Nagoya (JP); Nobufusa Kobayashi, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 537 days.

(21) Appl. No.: 11/879,515

(22) Filed: Jul. 18, 2007

(65) Prior Publication Data

US 2008/0039284 A1 Feb. 14, 2008

(30) Foreign Application Priority Data

Aug. 10, 2006 (JP) .............................. 2006-218680

(51) Int. Cl.
*B60W 10/06* (2006.01)
*B60W 10/10* (2006.01)

(52) U.S. Cl. ....................................... 477/107; 477/143

(58) Field of Classification Search .................. 477/115
See application file for complete search history.

(56) References Cited

U.S. PATENT DOCUMENTS

| 7,282,010 B2 * | 10/2007 | Iriyama et al. | ............... | 477/107 |
| 2007/0032340 A1 * | 2/2007 | Hrovat et al. | ............... | 477/107 |

FOREIGN PATENT DOCUMENTS

| JP | A-10-329584 | 12/1998 |
| JP | A 2001-248466 | 9/2001 |
| JP | A-2004-314842 | 11/2004 |

OTHER PUBLICATIONS

U.S. Appl. No. 11/879,513, filed Jul. 18, 2007 in the name of Tomohiro Asami et al.
U.S. Appl. No. 11/879,507, filed Jul. 18, 2007 in the name of Tomohiro Asami et al.
U.S. Appl. No. 11/879,502, filed Jul. 18, 2007 in the name of Tomohiro Asami et al.

* cited by examiner

*Primary Examiner*—Sherry L Estremsky
*Assistant Examiner*—Edwin A. Young
(74) *Attorney, Agent, or Firm*—Oliff & Berridge, PLC

(57) ABSTRACT

An engagement-pressure control portion and a first torque decrease control portion are provided. The engagement-pressure control portion controls an engagement pressure for a friction engagement element to be engaged when an automatic transmission upshifts so that the engagement pressure increases to a standby pressure at which an inertia phase does not start on the condition that torque output from a power source is equal to a first predetermined value, and then the engagement pressure is maintained at the standby pressure. The first torque decrease control portion controls the torque output from the power source so that the torque gradually decreases from the first predetermined value after the engagement pressure for the friction engagement element is maintained at the standby pressure, and a predetermined condition is satisfied.

11 Claims, 8 Drawing Sheets

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ : ENGAGED
× : DISENGAGED
◎ : ENGAGED WHEN ENGINE BRAKE IS APPLIED
△ : ENGAGED ONLY WHEN ENGINE DRIVES WHEELS

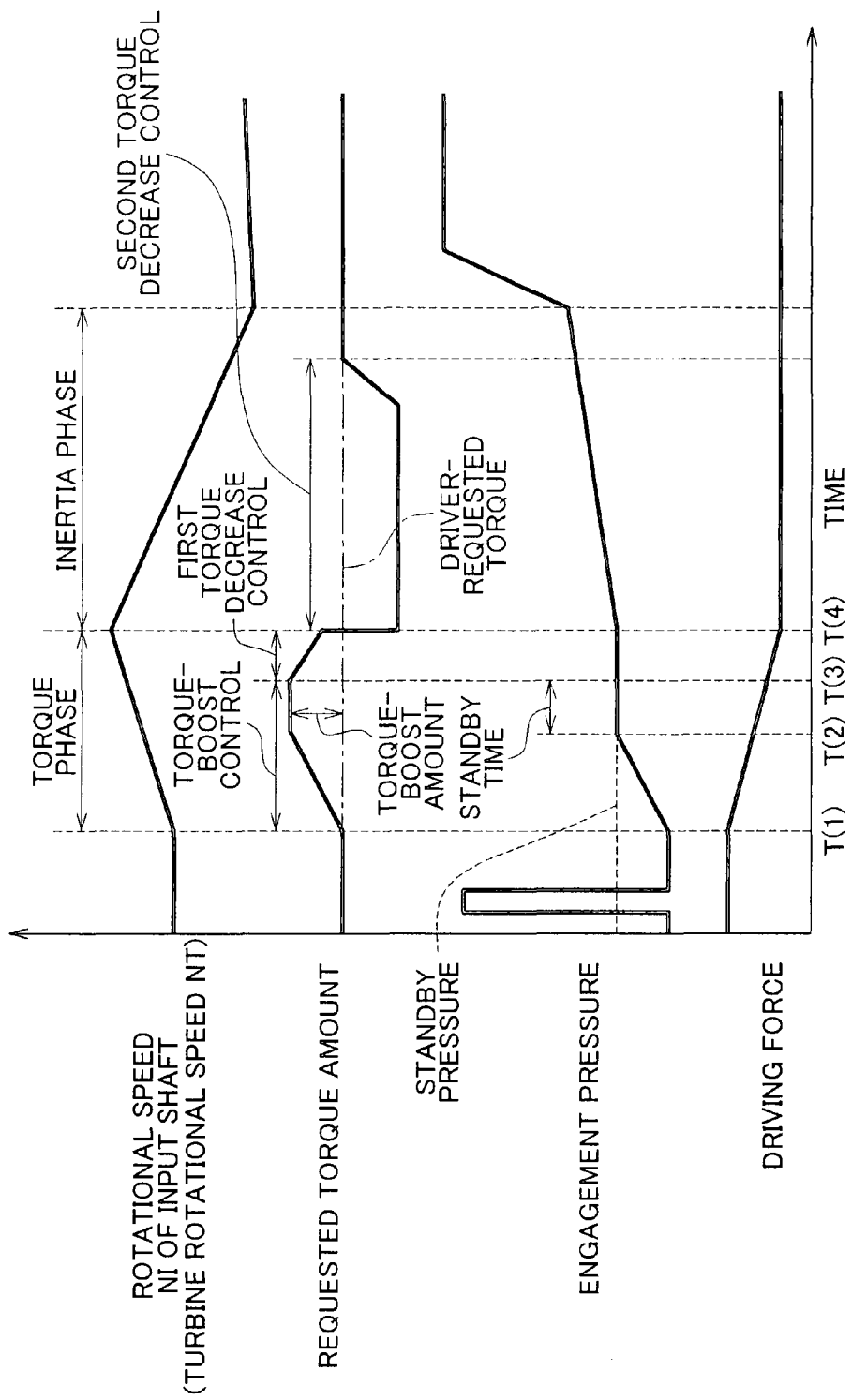

US 7,731,629 B2

CONTROL APPARATUS FOR VEHICLE AND METHOD OF CONTROLLING VEHICLE

INCORPORATION BY REFERENCE

The disclosure of Japanese Patent Application No. 2006-218680 filed on Aug. 10, 2006, including the specification, drawings and abstract is incorporated herein by reference in its entirety.

BACKGROUND OF THE INVENTION

1. Field of the Invention

The invention relates to a control apparatus for a vehicle, and a method of controlling a vehicle. More specifically, the invention relates to a technology in which torque output from a power source is boosted during a toque phase when an automatic transmission upshifts.

2. Description of the Related Art

When an automatic transmission upshifts, a driving force decreases during a torque phase, and then the driving force increases and a shock occurs when the torque phase ends and an inertia phase starts. To suppress the shock when the automatic transmission shifts, the technology in which the torque is boosted during the torque phase is proposed.

Japanese Patent Application Publication No. 2001-248466 (JP-A-2001-248466) describes an upshift shock reduction apparatus for an automatic transmission for a vehicle that includes a power train that includes a power source and the automatic transmission. When the automatic transmission upshifts, the upshift shock reduction apparatus boosts torque output from the power source, and then decreases the torque during the torque phase, thereby reducing a shock due to a decrease in the torque during the torque phase.

The upshift shock reduction apparatus described in the patent publication changes a timing at which the torque output from the power source starts to be decreased after the torque is boosted, according to the load of the power source so that the torque reliably starts to be decreased before the start of the inertia phase. Thus, although the start of the inertia phase chances according to the load of the power source, the torque reliably starts to be decreased before the start of the inertia phase. Therefore, the torque output from the power source is not maintained at a large value until the inertia phase starts. As a result, it is possible to avoid a problem that a shock occurs in an initial stage during the start of the inertia phase, or a problem that the inertia phase does not start until the end of the decrease in the torque.

The progress of the gear shift depends on the relation between torque input to the automatic transmission and transmission torque of a friction engagement element to be engaged (engagement pressure for the friction engagement element). When the transmission torque exceeds a value set in accordance with the input torque, the inertia phase starts. It is important to start the inertia phase by appropriately controlling the relation between the input torque and the transmission torque. However, the upshift shock reduction apparatus described in Japanese Patent Application Publication No. 2001-248466 decreases the increased engine torque in a stepwise manner during the torque phase. Therefore, it is difficult to appropriately control the relation between the input torque and the transmission torque. As a result, a shock may occur during the gear shift.

SUMMARY OF THE INVENTION

A first aspect of the invention relates to a control apparatus for a vehicle that includes a power source, and an automatic transmission connected to the power source, in which a gear is selected from among a plurality of gears with different gear ratios by selectively engaging a plurality of friction engagement elements. The control apparatus includes a torque-boost control portion, an engagement-pressure control portion, and a first torque decrease control portion. The torque-boost control portion controls torque output from the power source so that the torque output from the power source increases to a first predetermined value during a torque phase when the automatic transmission upshifts. The engagement-pressure control portion controls an engagement pressure for a friction engagement element to be engaged when the automatic transmission upshifts so that the engagement pressure increases to a standby pressure at which an inertia phase does not start on a condition that the torque output from the power source is equal to the first predetermined value, and then the engagement pressure is maintained at the standby pressure. The first torque decrease control portion controls the torque output from the power source so that the torque output from the power source gradually decreases from the first predetermined value after the engagement pressure for the friction engagement element is maintained at the standby pressure.

According to the first aspect, the inertia phase is started by gradually decreasing the torque output from the power source, that is, the torque input to the automatic transmission while a change in the engagement pressure for the friction engagement element is suppressed. Therefore, it is possible to appropriately control the relation between the torque input to the automatic transmission and the transmission torque of the friction engagement element at the time point when the inertia phase starts. As a result, it is possible to reduce a shock during the gear shift.

A second aspect of the invention relates to a method of controlling a vehicle that includes a power source, and an automatic transmission connected to the power source, in which a gear is selected from among a plurality of gears with different gear ratios by selectively engaging a plurality of friction engagement elements. The method includes controlling torque output from the power source so that the torque output from the power source increases to a first predetermined value during a torque phase when the automatic transmission upshifts; controlling an engagement pressure for a friction engagement element to be engaged when the automatic transmission upshifts so that the engagement pressure increases to a standby pressure at which an inertia phase does not start on a condition that the torque output from the power source is equal to the first predetermined value, and then the engagement pressure is maintained at the standby pressure; and controlling the torque output from the power source according to a first torque decrease control so that the torque output from the power source gradually decreases from the first predetermined value after the engagement pressure for the friction engagement element is maintained at the standby pressure.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is a diagram showing an operation table for the automatic transmission;

FIG. 9 is a timing chart showing changes in a requested torque amount and an engagement pressure according to the embodiment of the invention.

DETAILED DESCRIPTION OF THE EXAMPLE EMBODIMENTS

Figure 1:
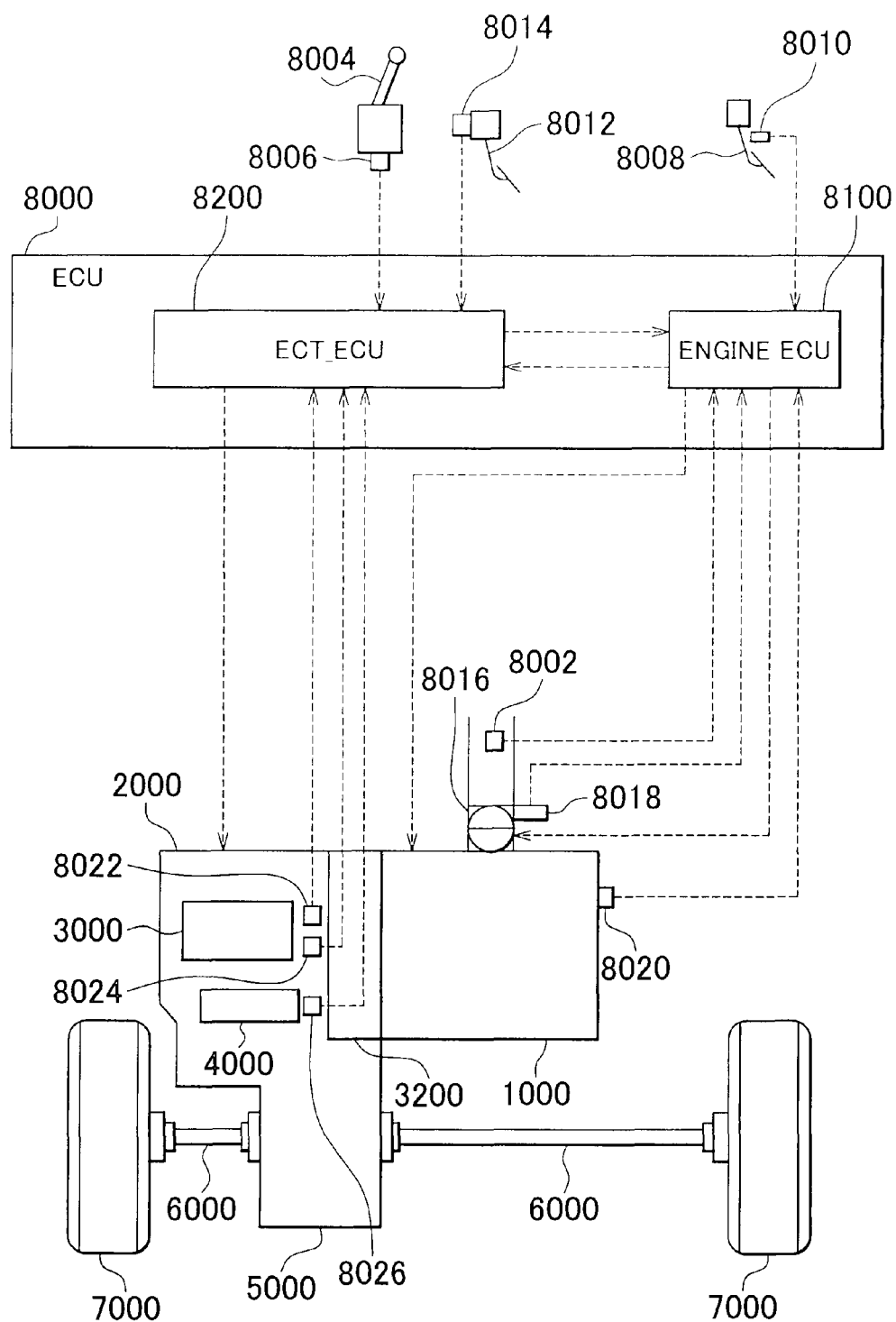
FIG. 1 is a schematic diagram showing the configuration of the power train of a vehicle.

Hereinafter, embodiments of the invention will be described with reference to the drawings. In the following description, the same and corresponding components are denoted by the same reference numerals, and have the same names and the same functions. Therefore, the detailed description thereof will not be repeated.

A vehicle provided with a control apparatus according to an embodiment of the invention will be described with reference to FIG. 1. The vehicle is a front-engine front-drive vehicle. The control apparatus according to the invention may be provided in a vehicle other than the front-engine front-drive vehicle.

The vehicle includes an engine 1000, an automatic transmission 2000; a planetary gear unit 3000 that constitutes a part of the automatic transmission 2000; a hydraulic circuit 4000 that constitutes a part of the automatic transmission 2000; a differential gear 5000; a drive shaft 6000; front wheels 7000; and an ECU (Electronic Control Unit) 8000. The control apparatus according to the embodiment may be implemented, for example, by executing a program stored in the ROM (Read Only Memory) of the ECU 8000.

The engine 1000 is an internal combustion engine in which mixture of air and fuel injected from an injector (not shown) is burned in the combustion chamber of each cylinder. A piston is pushed down in the cylinder by combustion, and thus a crankshaft is rotated. In addition to, or instead of the engine 1000, a motor may be employed as a power source.

The automatic transmission 2000 is connected to the engine 1000 via a torque converter 3200. When a desired gear is selected in the automatic transmission 2000, the rotational speed of the crankshaft input to the automatic transmission 2000 changes to the desired rotational speed.

The output gear of the automatic transmission 2000 engages with the differential gear 5000. The differential gear 5000 is connected to a drive shaft 6000, for example, using a spline. Power is transmitted to the front right and front left wheels 7000 via the drive shaft 6000.

The ECU 8000 is connected to an airflow meter 8002, a position switch 8006 for a shift lever 8004, an accelerator-pedal operation amount sensor 8010 for an accelerator pedal 8008, a brake-pedal force sensor 8014 for a brake pedal 8012, a throttle-valve opening amount sensor 8018 for an electronic throttle valve 8016, an engine speed sensor 8020, an input-shaft rotational speed sensor 8022, an output-shaft rotational speed sensor 8024, and an oil-temperature sensor 8026, for example, via harness.

The airflow meter 8002 detects the amount of air taken into the engine 1000 (hereinafter, will be sometimes referred to as "intake air amount"), and transmits a signal that indicates the detected intake air amount to the ECU 8000. The position switch 8006 detects the position of the shift lever 8004, and transmits a signal that indicates the detected shift lever position to the ECU 8000. The gear is automatically selected in the automatic transmission 2000, according to the position of the shift lever 8004. A manual shift mode may also be selected. When the manual shift mode is selected, a driver may select any gear by manual operation.

The accelerator-pedal operation amount sensor 8010 detects the operation amount of the accelerator pedal 8008 (hereinafter, referred to as "accelerator-pedal operation amount"), and transmits a signal that indicates detected accelerator-pedal operation amount to the ECU 8000. The brake-pedal force sensor 8014 detects the force applied to the brake pedal 8012, and transmits a signal that indicates the detected force to the ECU 8000.

The throttle-valve opening amount sensor 8018 detects the opening amount of the electronic throttle valve 8016, and transmits a signal that indicates the detected opening amount to the ECU 8000. The opening amount of the electronic throttle valve 8016 is adjusted by an actuator. The electronic throttle valve 8016 adjusts the amount of air taken into the engine 1000 (i.e., output from the engine 1000).

The amount of air taken into the engine 1000 may be adjusted by adjusting the lifts of an intake valve (not shown) and an exhaust valve (not shown), or the rotational phases for opening/closing the intake valve and exhaust valve, instead of, or in addition to operating the electronic throttle valve 8016.

The engine speed sensor 8020 detects the rotational speed of the crankshaft of the engine 1000, and transmits a signal that indicates the detected crankshaft speed to the ECU 8000. The input-shaft rotational speed sensor 8022 detects the rotational speed NI of the input shaft of the automatic transmission 2000 (i.e. the rotational speed NT of the turbine of the torque converter 3200), and transmits a signal that indicates the detected input shaft speed to the ECU 8000. The output-shaft rotational speed sensor 8024 detects the rotational speed NO of the output shaft of the automatic transmission 2000, and transmits a signal that indicates the detected output shaft speed to the ECU 8000.

The oil-temperature sensor 8026 detects the temperature of automatic transmission fluid (ATF), used for operating and lubricating the automatic transmission 2000, and transmits the detected ATF temperature to the ECU 8000.

The ECU 8000 controls devices so that the vehicle moves in a desired state, based on the signals transmitted from the airflow meter 8002, position switch 8006, accelerator-pedal operation amount sensor 8010, brake-pedal force sensor 8014, throttle-valve opening amount sensor 8018, engine speed sensor 8020, input-shaft rotational speed sensor 8022, output-shaft rotational speed sensor 8024, oil-temperature sensor 8026, and the like, and maps and programs stored in the ROM (Read Only Memory).

In this embodiment, when the shift lever 8004 is in D (Drive), and accordingly the D (Drive) range is selected in the automatic transmission 2000, the ECU 8000 controls the automatic transmission 2000 so that one of a first gear to a sixth gear is selected. When one of the first gear to the sixth gear is selected, the automatic transmission 2000 transmits driving force to the front wheels 7000. In the D range, at least one higher gear than the sixth gear may be provided. That is, for example, a seventh gear and an eighth gear may be provided. The gear is selected based on a shift diagram that is made in advance, for example, empirically. In the shift diagram, the vehicle speed and accelerator-pedal operation amount are used as parameters.

As shown in FIG. 1, the ECU 8000 includes an engine ECU 8100 that controls the engine 1000, and an ECT (Electronic Controlled Transmission) ECU 8200 that controls the automatic transmission 2000.

The engine ECU 8100 transmits/receives signals to/from the ECT_ECU 8200. In this embodiment, the engine ECU 8100 transmits the signal that indicates the accelerator-pedal operation amount and the signal that indicates the torque output from the engine 1000 to the ECT_ECU 8200. The ECT_ECU 8200 transmits the signal that indicates a requested torque amount that is defined as torque that needs to be output from the engine 1000" to the engine ECU 8100.

Figure 2:
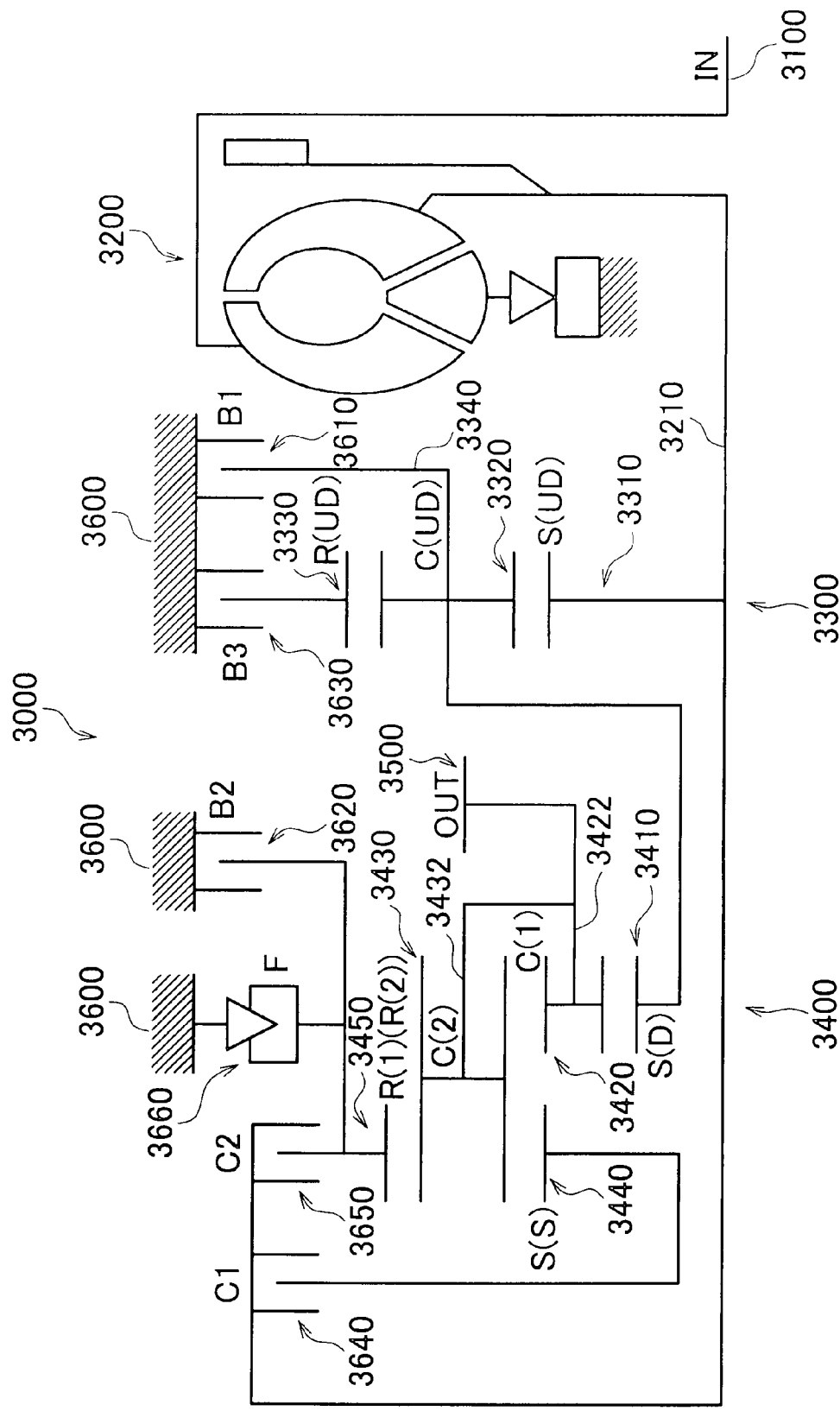
FIG. 2 is a skeleton diagram showing the planetary gear unit of an automatic transmission.

The planetary gear unit 3000 will be described with reference to FIG. 2. The planetary gear unit 3000 is connected to the torque converter 3200 that includes the input shaft 3100 connected to the crankshaft. The planetary gear unit 3000 includes a first planetary gear set 3300, a second planetary gear set 3400, an output gear 3500, a B1 brake 3610, a B2 brake 3620, and a B3 brake 3630, a C1 clutch 3640 and a C2 clutch 3650, and a one-way clutch F3660. The B1 brake 3610, B2 brake 3620, and B3 brake 3630 are fixed to the gear case 3600.

The first planetary gear set 3300 is a single pinion type planetary gear mechanism. The first planetary gear set 3300 includes a sun gear S (UD) 3310, a pinion 3320, a ring gear R (UD) 3330, and a carrier C (UD) 3340.

The sun gear S (UD) 3310 is connected to the output shaft 3210 of the torque converter 3200. The pinion 3320 is rotatably supported by the carrier C (UD) 3340. The pinion 3320 engages with the sun gear S (UD) 3310 and ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second planetary gear set 3400 is a Ravigneaux type planetary gear mechanism. The second planetary gear set 3400 includes a sun gear S (D) 3410, a short pinion 3420, a carrier C (1) 3422, a long pinion 3430, a carrier C (2) 3432, a sun gear S (S) 3440, and a ring gear R (1) (R (2)) 3450.

The Sun gear S (D) 3410 is connected to the carrier C (UD) 3340. The short pinion 3420 is rotatably supported by the carrier C (1) 3422. The short pinion 3420 engages with the sun gear S (D) 3410, and long pinion 3430. The carrier C (1) 3422 is connected to the output gear 3500.

The long pinion 3430 is rotatably supported by the carrier C (2) 3432. The long pinion 3430 engages with the short pinion 3420, sun gear S (S) 3440, and ring gear R (I) (R (2)) 3450. The carrier C (2) 3432 is connected to the output gear 3500.

The Sun gear S (S) 3440 is connected to the output shaft 3210 of the torque converter 3200 by the C1 clutch 3640. The ring gear R (1) (R (2)) 3450 is fixed to the gear case 3600 by the B2 brake 3620, and connected to the output shaft 3210 of the torque converter 3200 by the C2 clutch 3650. The ring gear R (1) (R (2)) 3450 is connected to the one-way clutch F3660. When the engine drives the wheels in the first gear, the ring gear R (1) (R (2)) 3450 is prevented from rotating.

The one-way clutch F3660 is provided in parallel with the B2 brake 3620. That is, the outer race of the one-way clutch F3660 is fixed to the gear case 3600. The inner race of the one-way clutch F3660 is connected to the ring gear R (1) (R (2)) 3450 via a rotation shaft.

FIG. 3 is an operation table that shows the relation between the gears and the operating states of the clutches and brakes. By operating the brakes and clutches as shown in the operation table, one of the first gear to the sixth gear, and a reverse gear is selected.

Figure 4:
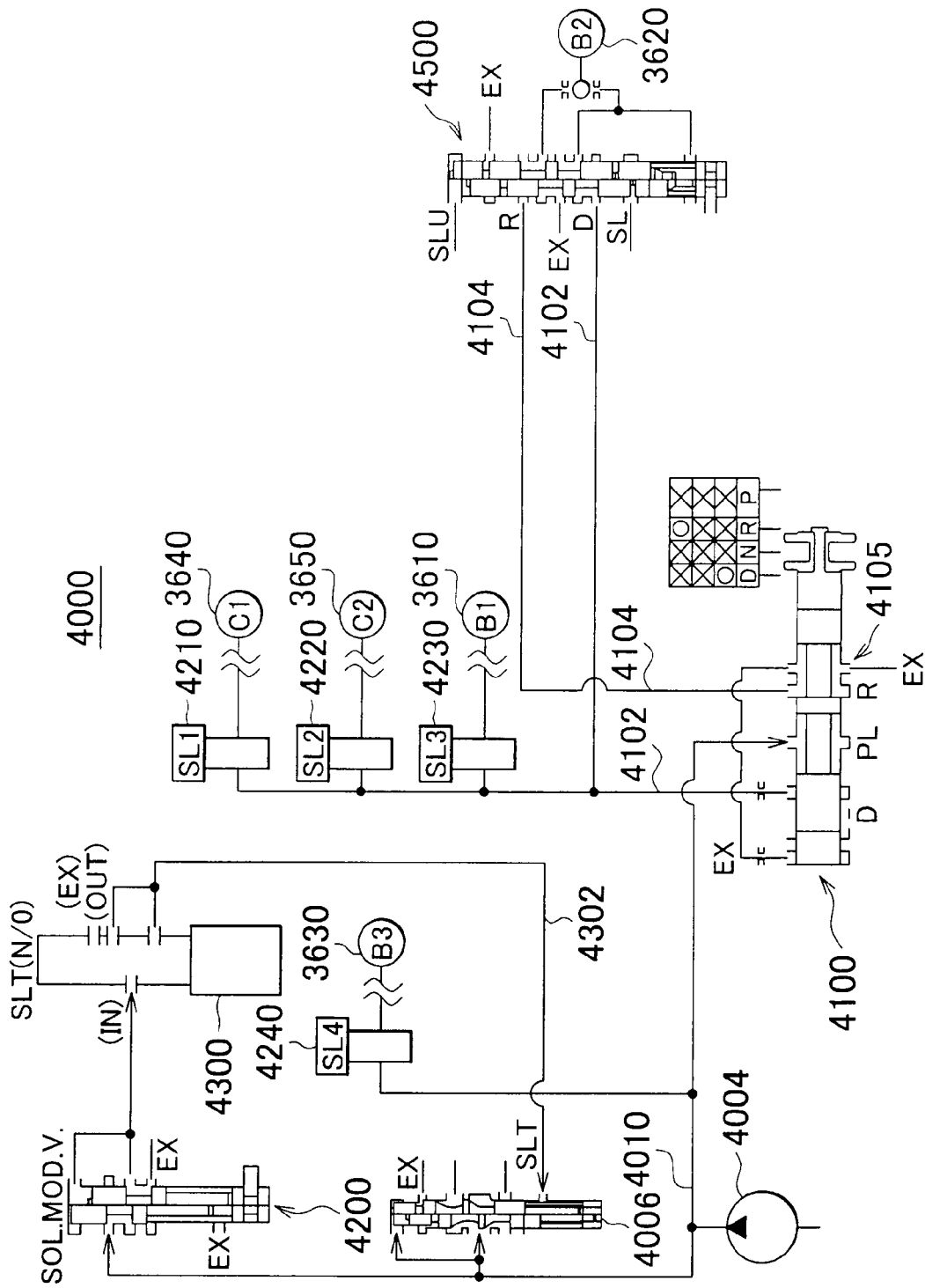
FIG. 4 is a diagram showing the hydraulic circuit of the automatic transmission.

As shown in FIG. 4, the main part of the hydraulic circuit 4000 will be described. The hydraulic circuit 4000 is not limited to the circuit described below.

The hydraulic circuit 4000 includes an oil pump 4004, a primary regulator valve 4006, a manual valve 4100, a solenoid modulator valve 4200, an SL1 linear solenoid (hereinafter, simply referred to as SL (1)) 4210, an SL2 linear solenoid (hereinafter, simply referred to as SL (2)) 4220, an SL3 linear solenoid (hereinafter, simply referred to as SL (3)) 4230, an SL4 linear solenoid (hereinafter, simply referred to as SL (4)) 4240, an SLT linear solenoid (hereinafter, simply referred to as SLT) 4300, and a B2 control valve 4500.

The oil pump 4004 is connected to the crankshaft of the engine 1000. By, rotating the crankshaft, the oil pump 4004 generates a hydraulic pressure. The primary regulator valve 4006 regulates the hydraulic pressure generated by the oil pump 4004, which is the source pressure, to a line pressure.

The primary regulator valve 4006 is operated by a throttle pressure that functions as a pilot pressure. The SLT 4300 regulates a solenoid modulator pressure to the throttle pressure, as described later. The line pressure is supplied to the manual valve 4100 via a line pressure oil passage 4010.

The manual valve 4100 includes a drain port 4105. The hydraulic pressure in a D-range pressure oil passage 4102 and the hydraulic pressure in an R-range pressure oil passage 4104 are discharged through the drain port 4105. When the spool of the manual valve 4100 is at the position D, communication is provided between the line pressure oil passage 4010 and the D-range pressure oil passage 4102, and thus, the hydraulic pressure is supplied to the D-range pressure oil passage 4102. At this time, communication is provided between the R-range pressure oil passage 4104 and the drain port 4105, and thus, the R-range pressure in the R-range pressure oil passage 4104 is discharged through the drain port 4105.

When the spool of the manual valve 4100 is at position R, communication is provided between the line pressure oil passage 4010 and the R-range pressure oil passage 4104, and thus, the hydraulic pressure is supplied to the R-range pressure oil passage 4104. At this time, communication is provided between the D-range pressure oil passage 4102 and the drain port 4105, and thus, the D-range pressure in the D-range pressure oil passage 4102 is discharged through the drain port 4105.

When the spool of the manual valve 4100 is at the position N, communication is provided between the D-range pressure oil passage 4102 and the drain port 4105, and between the R-range pressure oil passage 4104 and the drain port 4105. Thus, the D-range pressure in the D-range pressure oil passage 4102 and the R-range pressure in the R-range pressure oil passage 4104 are discharged through the drain port 4105.

The hydraulic pressure supplied to the D-range pressure oil passage 4102 is finally supplied to the B1 brake 3610. B2 brake 3620. C1 clutch 3640, and C2 clutch 3650. The hydraulic pressure supplied to the R-range pressure oil passage 4104 is finally supplied to the B2 brake 3620.

The solenoid modulator valve 4200 regulates the line pressure, which is the source pressure, to the constant solenoid modulator pressure to be supplied to the SLT 4300.

The SL (1) 4210 regulates a hydraulic pressure to be supplied to the C1 clutch 3640. The SL (2) 4220 regulates a hydraulic pressure to be supplied to the C2 clutch 3650. The SL (3) 4230 regulates a hydraulic pressure to be supplied to the B1 brake 3610. The SL (4) 4240 regulates a hydraulic pressure to be supplied to the B3 brake 3630.

The SLT 4300 regulates the solenoid modulator pressure, which is the source pressure, to the throttle pressure according to a control signal from the ECU 8000. The ECU 8000 transmits the control signal based on the accelerator-pedal operation amount detected by the accelerator-pedal operation amount sensor 8010. The throttle pressure is supplied to the primary regulator valve 4006 via an SLT oil passage 4302. The throttle pressure is used as the pilot pressure for the primary regulator valve 4006.

The SL (1) 4210, SL (2) 4220, SL (3) 4230, SL (4) 4240, and SLT 4300 are controlled by the control signals transmitted from the ECU 8000.

The B2 control valve 4500 selectively supplies the hydraulic pressure in the D-range pressure oil passage 4102 or the hydraulic pressure in the R-range pressure oil passage 4104 to the B2 brake 3620. The B2 control valve 4500 is connected to the D-range pressure oil passage 4102 and the R-range pressure oil passage 4104. The B2 control valve 4500 is controlled by the hydraulic pressure supplied from an SL solenoid valve (not shown) and the hydraulic pressure supplied from an SLU solenoid valve (not shown), and the impelling force of a spring.

When the SL solenoid valve is off, and the SLU solenoid valve is on, the B2 control valve 4500 is in the state as shown in the left half of the B2 control valve 4500 in FIG. 4. In this case, the B2 control valve 4500 is operated by the hydraulic pressure supplied from the SLU solenoid valve, which functions as the pilot pressure. Thus, the B2 control valve 4500 regulates the D-range pressure, and supplies the regulated D-range pressure to the B2 brake 3620.

When the SL solenoid valve is on, and the SLU solenoid valve is off, the B2 control valve 4500 is in the state as shown in the right half of the B2 control valve 4500 in FIG. 4. In this case, the B2 control valve 4500 supplies the R-range pressure to the B2 brake 3620.

Figure 5:
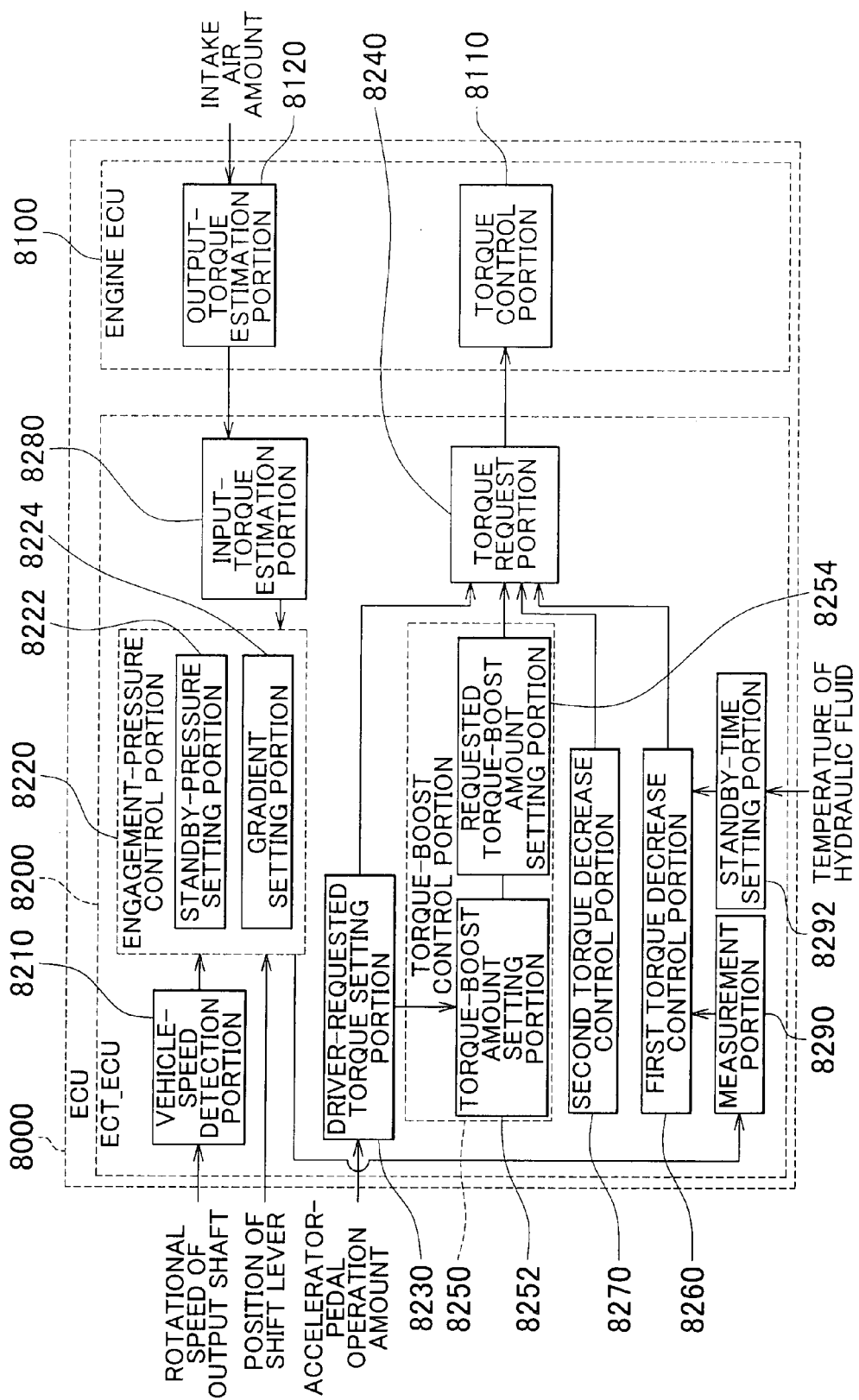
FIG. 5 is a function block diagram showing an ECU according to an embodiment of the invention.

The ECU 8000 will be further described with reference to FIG. 5. The function of the ECU 8000 described below may be implemented through hardware or software.

The engine ECU 8100 of the ECU 8000 includes a torque control portion 8110, and an output-torque estimation portion 8120. The torque control portion 8110 receives the signal that indicates the requested torque amount from the ECT_ECU 8200. Then, the torque control portion 8110 controls the opening amount of the electronic throttle valve 8016 and the timing at which an ignition plug ignites air-fuel mixture so that the actual torque output from the engine 1000 is equal to the requested torque amount.

The output-torque estimation portion 8120 estimates the torque output from the engine 1000, based on the amount of intake air detected by the airflow meter 8002. As the method of estimating the torque output from the engine 1000, a known ordinary technology may be used. Therefore, the detailed description thereof will be omitted. The torque estimated by the output-torque estimation portion 8120 is input to the ECT_ECU 8200.

The ECT_ECU 8200 of the ECU 8000 includes a vehicle-speed detection portion 8210, an engagement-pressure control portion 8220, a driver-requested torque setting portion 8230, a torque request portion 8240, a torque-boost control portion 8250, a first torque decrease control portion 8260, a second torque decrease control portion 8270, an input-torque estimation portion 8280, a measurement portion 8290, and a standby-time setting portion 8292.

The vehicle-speed detection portion 8210 calculates (detects) the vehicle speed based on the rotational speed NO of the output shaft of the automatic transmission 2000. The engagement-pressure control portion 8220 controls the hydraulic pressures, that is, the engagement pressures for the B1 brake 3610. B2 brake 3620. B3 brake 3630. C1 clutch 3640, and C2 clutch 3650 during the gear shift, and after the gear shift ends.

The engagement-pressure control portion 8220 includes a standby-pressure setting portion 8222 and a gradient setting portion 8224. The standby-pressure setting portion 8222 sets a standby pressure of the engagement pressure for the friction engagement element to be engaged when the automatic transmission 2000 upshifts, using torque input to the automatic transmission 2000 as the parameter. The standby pressure is used during the torque phase.

The standby-pressure setting portion 8222 sets the standby pressure such that if the engagement pressure is equal to the standby pressure during a torque-boost control (described later) and before a first torque decrease control (described later) is executed, the inertia phase does not start.

The gradient setting portion 8224 sets the gradient of the engagement pressure for the friction engagement element to be engaged when the automatic transmission 2000 shifts (upshifts). More specifically, the gradient setting portion 8224 sets the gradient used to gradually increase the engagement pressure for the friction engagement element during the inertia phase, using the torque input to the automatic transmission 2000 as the parameter. The gradient is set to increase as the torque input to the automatic transmission 2000 increases. Instead of the gradient, a target value of the engagement pressure may be set to increase as the torque input to the automatic transmission 2000 increases.

The driver-requested torque setting portion 8230 sets a driver-requested torque based on the accelerator-pedal operation amount, and the like. The driver-requested torque is the torque requested by the driver. The driver-requested torque is set to increase as the accelerator-pedal operation amount increases.

The torque request portion 8240 sets the requested torque amount based on the driver-requested torque, and the like. The requested torque amount is the torque 6 required of the engine 1000. For example, when the automatic transmission 2000 is not shifting, and accordingly the vehicle is steadily moving, the requested torque amount is set to the driver-requested torque.

The torque-boost control portion 8250 executes the torque-boost control to boost the torque during the torque phase when the automatic transmission 2000 upshifts. The torque-boost control portion 8250 includes a torque-boost amount setting portion 8252, and a requested torque-boost amount setting portion 8254.

The torque-boost amount setting portion 8252 sets a torque-boost amount, which is the amount by which the torque output from the engine 1000 needs to be boosted, of the torque-boost control. The torque-boost amount is set based on the driver-requested torque, that is, the accelerator-pedal operation amount.

The requested torque-boost amount setting portion 8254 sets a requested torque-boost amount to increase the torque output from the engine 1000 by the torque-boost amount in a predetermined manner during the torque phase when the automatic transmission 2000 upshifts. That is, the requested torque-boost amount increases in the predetermined manner during the torque phase, and finally reaches the torque-boost amount.

When the torque-boost control is executed, the torque request portion 8240 sets the requested torque amount to the sum of the driver-requested torque and the requested torque-boost amount.

The first torque decrease control portion 8260 executes the first torque decrease control that gradually decreases the torque output from the engine 1000 at a predetermined gradient during the torque phase. During the first torque decrease control, the first torque decrease control portion 8260 sets a requested torque to gradually decrease the torque when a standby time has elapsed after an instruction is provided to maintain the engagement pressure for the friction engagement element at the standby pressure. The standby time is set by the standby-time setting portion 8292.

When the first torque decrease control is being executed, the torque request portion 8240 sets the requested torque amount to the requested torque set by the first torque decrease control portion 8260.

The second torque decrease control portion 8270 executes a second torque decrease control that decreases the torque output from the engine during the inertia phase when the automatic transmission 2000 upshifts. During the second torque decrease control, the second torque decrease control portion 8270 sets the requested torque to decrease the torque to a value lower than the driver-requested torque.

When the second torque decrease control is being executed, the torque request portion 8240 sets the requested torque amount to the requested torque set by the second torque decrease control portion 8270.

The input-torque estimation portion 8280 estimates the torque input to the automatic transmission 2000, based on the output torque estimated by the output-torque estimation portion 8120 of the engine ECU 8100, and the torque ratio of the torque converter 3200. As the method of estimating the torque input to the automatic transmission 2000, a known ordinary technology may be used. Therefore, the detailed description thereof will be omitted.

The measurement portion 8290 measures an elapsed time after the instruction is provided to maintain the engagement pressure for the friction engagement element at the standby pressure. The standby-time setting portion 8292 sets the standby time from when the instruction is provided to maintain the engagement pressure for the friction engagement element at the standby pressure until when the first torque decrease control is executed. For example, the standby time is set to the time required to stabilize the engagement pressure.

Figure 6:
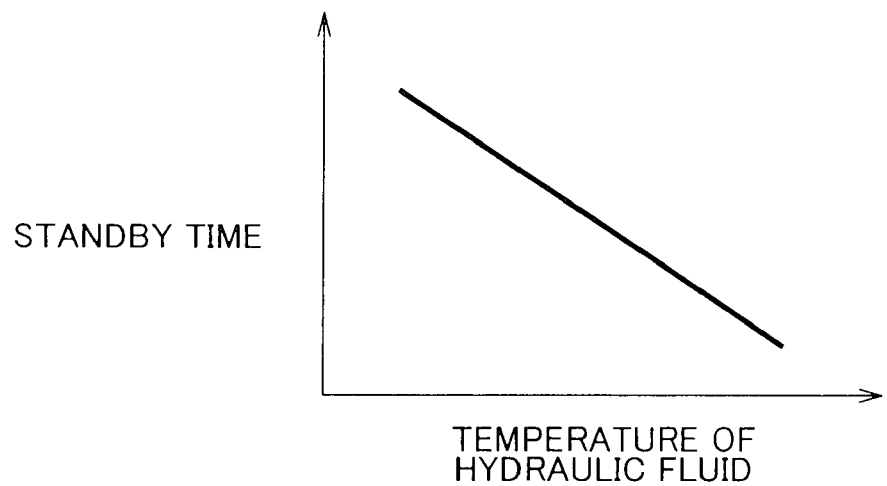
FIG. 6 is a first graph showing the relation between the temperature of hydraulic fluid and a standby pressure according to the embodiment of the invention.
Figure 7:
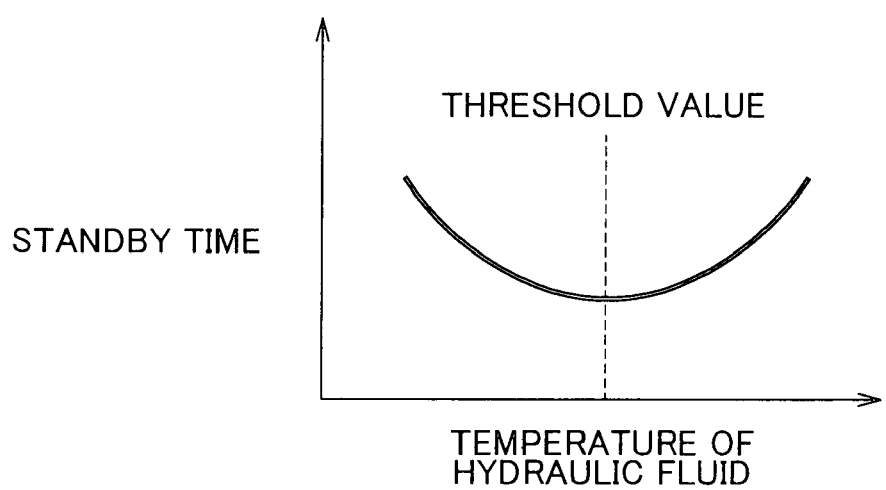
FIG. 7 is a second graph showing the relation between the temperature of hydraulic fluid and the standby pressure according to the embodiment of the invention.

When the standby time is set according to the viscosity of the hydraulic fluid, the standby-time setting portion 8292 sets the standby time so that the standby time increases as the temperature of the hydraulic fluid decreases, as shown in FIG. 6, for the following reason. When the temperature of the hydraulic fluid is low, the viscosity of the hydraulic fluid is high. Therefore, when the temperature of the hydraulic fluid is low, and accordingly the viscosity of the hydraulic fluid is high, the time required to stabilize the engagement pressure is longer than that when the temperature of the hydraulic fluid is high, and accordingly the viscosity of the hydraulic fluid is low. Note that, it is considered that when the viscosity of the hydraulic fluid is low, a large amount of hydraulic fluid leaks through gaps in the hydraulic circuit, and therefore the time required to stabilize the engagement pressure is long. Thus, as shown in FIG. 7, when the temperature of the hydraulic fluid is equal to or below a threshold value, the standby time may be set to increase as the temperature of the hydraulic fluid decreases. When the temperature of the hydraulic fluid is above the threshold value, the standby time may be set to increase as the temperature of the hydraulic fluid increases. When the temperature of the hydraulic fluid is equal to or below the threshold value, the influence of the viscosity of the hydraulic fluid on the time required to stabilize the engagement pressure is greater than the influence of the leak of the hydraulic fluid on the time required to stabilize the engagement pressure. When the temperature of the hydraulic fluid is above the threshold value, the influence of the leak of the hydraulic fluid on the time required to stabilize the engagement pressure is greater than the influence of the viscosity of the hydraulic fluid on the time required to stabilize the engagement pressure.

Figure 8:
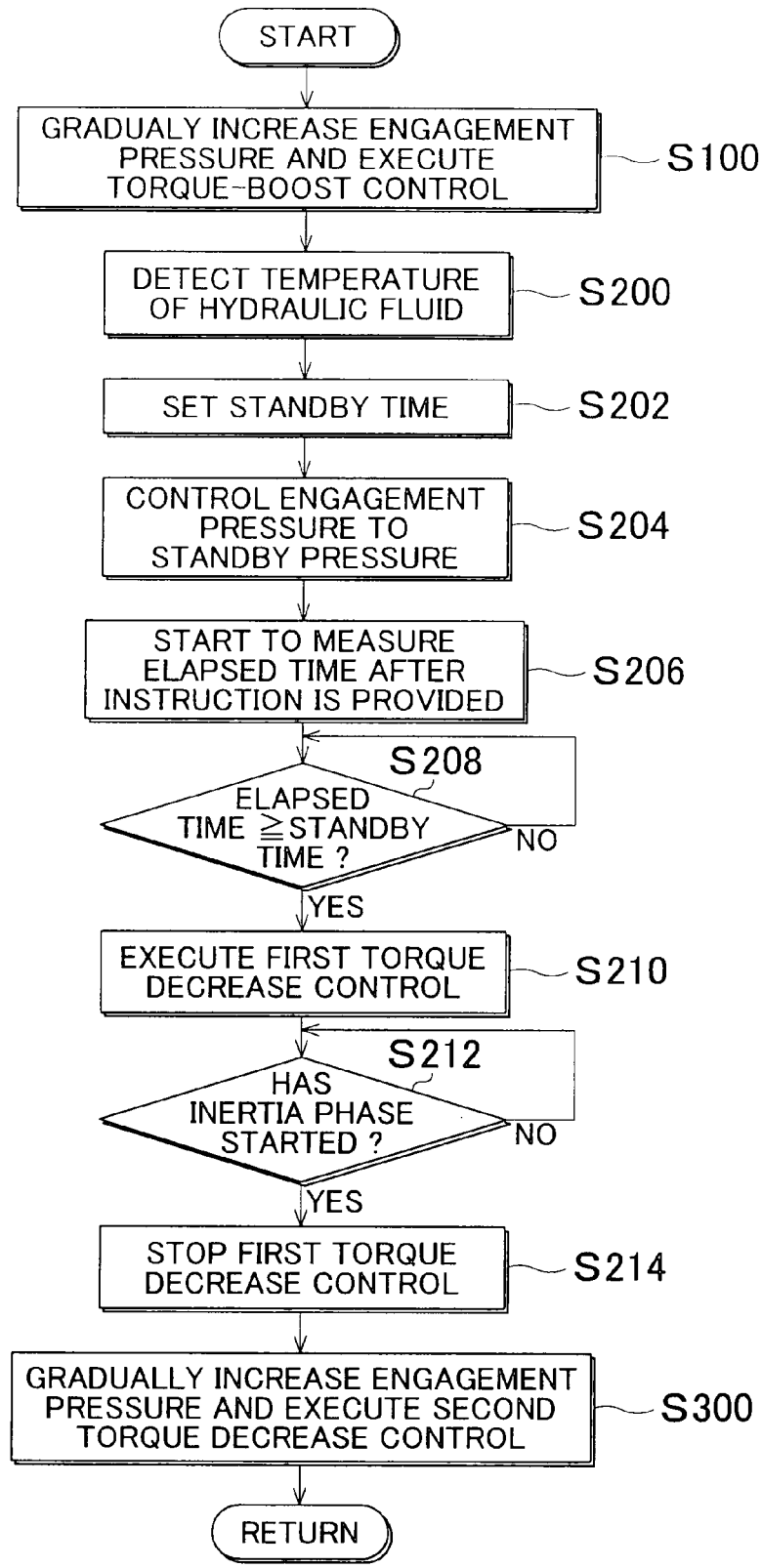
FIG. 8 is a flowchart showing a routine executed by an ECU that is a control apparatus according to the embodiment of the invention.

As shown in FIG. 8, the routine executed by the ECU 8000 when the automatic transmission 2000 upshifts will be described. The ECU 8000 is the control apparatus according to the embodiment. The routine described below is repeatedly executed at predetermined time intervals.

In step S100, the ECU 8000 gradually increases the engagement pressure for the friction engagement element to be engaged when the automatic transmission 2000 upshifts. Also, the ECU 8000 executes the torque-boost control for the engine 1000.

In step S200, the ECU 8000 detects the temperature of the hydraulic fluid, based on the signal transmitted from the oil-temperature sensor 8026. In step S202, the ECU 8000 sets the standby time so that the standby time increases as the detected temperature of the hydraulic fluid decreases.

In step S204, the ECU 8000 controls the engagement pressure for the friction engagement element to be engaged when the automatic transmission 2000 upshifts so that the engagement pressure is maintained at the standby pressure during the torque phase. That is, the ECU 8000 outputs the instruction to maintain the engagement pressure for the friction engagement element at the standby pressure.

In step S206, the ECU 8000 starts to measure the elapsed time after the instruction is provided to maintain the engagement pressure for the friction engagement element at the standby pressure. In step S208, the ECU 8000 determines whether the elapsed time is equal to or longer than the standby time. When the elapsed time is equal to or longer than the standby time (YES in step S208), the routine proceeds to step S210. When the elapsed time is shorter than the standby time (NO in step S208), the routine returns to step S208.

In step S210, the ECU 8000 executes the first torque decrease control. That is, the torque output from the engine 1000 is gradually decreased at the predetermined gradient.

In step S212, the ECU 8000 determines whether the inertia phase has started. The ECU 8000 determines that the inertia phase has started, when the rotational speed NJ of the input shaft of the automatic transmission 2000 is lower than a value obtained by multiplying the rotational speed NO of the output shaft of the automatic transmission 2000 by the gear ratio of the gear selected before the gear shift (upshift) starts. The method of determining whether the inertia phase has started is not limited to this method. When the inertia phase has started (YES in step S212), the routine proceeds to step S214. When the inertia phase has not started (NO in step S214), the routine returns to step S212. In step S214, the ECU 8000 stops the first torque decrease control.

In step S300, the ECU 8000 gradually increases the engagement pressure for the friction engagement element to be engaged when the automatic transmission 2000 upshifts. Also, the ECU 8000 executes the second torque decrease control for the engine 1000.

The operation of the ECU 8000 based on the above-described structure and flowchart will be described. The ECU 8000 is the control apparatus according to the embodiment.

When the automatic transmission 2000 upshifts, the ECU 8000 gradually increases the engagement pressure for the friction engagement element to be engaged during the upshift, and executes the torque-boost control for the engine 1000 at time T (1) (S100). That is, the torque phase starts at time T (1).

Further, the ECU 8000 detects the temperature of the hydraulic fluid based on the signal transmitted from the oil-temperature sensor 8026 (S200). Based on the detected temperature of the hydraulic fluid, the ECU 8000 sets the standby time so that the standby time increases as the temperature of the hydraulic fluid decreases (S202).

Then, at time T (2) in FIG. 9, the ECU 8000 controls the engagement pressure for the friction engagement element to be engaged when the automatic transmission 2000 upshifts so that the engagement pressure is maintained at the standby pressure at which the inertia phase does not start, during the torque phase (S204).

When the instruction is provided to maintain the engagement pressure for the friction engagement element at the standby pressures the ECU 8000 starts to measure the elapsed time (S206). When the elapsed time is equal to or longer than the standby time at time T (3) in FIG. 9 (YES in step S208), it is considered that the engagement pressure is stable.

In this situation, the ECU 8000 executes the first torque decrease control (S210). That is, the torque output from the engine 1000 is gradually decreased at the predetermined gradient. Then, when the inertia phase starts at time T (4) in FIG. 9 (YES in step S212), the ECU 8000 stops the first torque decrease control (S214). That is, the ECU 8000 continues to execute the first torque decrease control until the inertia phase starts.

Thus, the inertia phase is started by gradually decreasing the torque output from the engine 1000, that is, the torque input to the automatic transmission 2000 while a change in the engagement pressure for the friction engagement element is suppressed.

After the first torque decrease control is stopped, the ECU 8000 gradually increases the engagement pressure for the friction engagement element to be engaged when the transmission 2000 upshifts, and executes the second torque decrease control for the engine 1000 (S300).

As described above, the ECU, which is the control apparatus according to the embodiment, controls the engagement pressure for the friction engagement element so that the engagement pressure is maintained at the standby pressure at which the inertia phase does not start, during the torque phase. When the elapsed time after the instruction is provided to maintain the engagement pressure for the function engagement element at the standby pressure is equal to or longer than the standby time, the torque output from the engine is gradually decreased. Thus, the inertia phase is started by gradually decreasing the torque output from the engine, that is, the torque input to the automatic transmission while a change in the engagement pressure for the friction engagement element is suppressed. That is, the inertia phase is started when the engagement pressure for the friction engagement element is considered to be stable. Thus, it is possible to appropriately control the relation between the torque input to the automatic transmission and the transmission torque of the friction engagement element at the time point when the inertia phase starts. As a result, it is possible to reduce a shock during the gear shift.

The ECU, which is the control apparatus according to the embodiment, sets the standby time until the start of the gradual decrease in the torque output from the power source, according to the viscosity of the hydraulic fluid. Thus, when the viscosity of the hydraulic fluid is high, and accordingly the time required to stabilize the engagement pressure is considered to be long, the standby time until the start of the gradual decrease in the torque output from the power source is set to be long. In contrast, when the viscosity is low, and accordingly the time required to stabilize the engagement pressure is considered to be short, the standby time until the start of the gradual decrease in the torque output from the power source is set to be short. As a result, the inertia phase is started by gradually decreasing the torque output from the power source while the engagement pressure for the friction engagement element is considered to be stable.

When the temperature of the hydraulic fluid of the automatic transmission is low, the time from when the instruction is provided to maintain the engagement pressure for the friction engagement element at the standby pressure until when the torque output from the power source starts to be gradually decreased is set to be long, as compared to when the temperature of the hydraulic fluid is high. Thus, when the temperature of the hydraulic fluid of the automatic transmission is low and the viscosity of the hydraulic fluid is high, and accordingly the time required to stabilize the engagement pressure is considered to be long, the time until the start of the gradual decrease in the torque output from the power source is set to be long. In contrast, when the temperature of the hydraulic fluid is high and the viscosity of the hydraulic fluid is low, and accordingly the time required to stabilize the engagement pressure is considered to be short, the time until the start of the gradual decrease in the torque output from the power source is set to be short. Therefore, the inertia phase is started by gradually decreasing the torque output from the power source while the engagement pressure for the friction engagement element is considered to be stable.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a vehicle that includes a power source, and an automatic transmission connected to the power source, in which a gear is selected from among a plurality of gears with different gear ratios by selectively engaging a plurality of friction engagement elements, the control apparatus comprising:

a torque-boost control portion that controls torque output from the power source so that the torque output from the power source increases to a first predetermined value during a torque phase when the automatic transmission upshifts;

an engagement-pressure control portion that controls an engagement pressure for a friction engagement element to be engaged when the automatic transmission upshifts so that the engagement pressure increases to a standby pressure at which an inertia phase does not start on a condition that the torque output from the power source is equal to the first predetermined value, and then the engagement pressure is maintained at the standby pressure; and a first torque decrease control portion that controls the torque output from the power source so that the torque output from the power source gradually decreases from the first predetermined value after the engagement pressure for the friction engagement element is maintained at the standby pressure.

2. The control apparatus for the vehicle according to claim 1, further comprising a measurement portion that measures an elapsed time after an instruction is provided to maintain the engagement pressure for the friction engagement element at the standby pressure, wherein the first torque decrease control portion gradually decreases the torque output from the power source from the first predetermined value when the elapsed time reaches a predetermined standby time.

3. The control apparatus for the vehicle according to claim 2, further comprising a standby-time setting portion that sets the predetermined standby time based on a temperature of hydraulic fluid of the automatic transmission.

4. The control apparatus for the vehicle according to claim 3, wherein the standby-time setting portion sets the standby time so that the standby time increases as the temperature of the hydraulic fluid of the automatic transmission decreases.

5. The control apparatus for the vehicle according to claim 1, further comprising a second torque decrease control portion that executes a torque decrease control that decreases the torque output from the power source to a second predetermined value that is lower than a driver-requested torque, after the inertia phase starts, wherein after the inertia phase starts, the first torque decrease control portion stops gradually decreasing the torque, the second torque decrease control portion starts the torque decrease control, and the engagement-pressure control portion gradually increases the engagement pressure for the friction engagement element.

6. The control apparatus for the vehicle according to claim 5, wherein the engagement-pressure control portion sets a gradient used to gradually increase the engagement pressure during the inertia phase, based on a value of the torque output from the power source.

7. The control apparatus for the vehicle according to claim 6, wherein the engagement-pressure control portion sets the gradient so that the gradient increases as the value of the torque output from the power source increases.

8. The control apparatus for the vehicle according to claim 1, wherein the engagement-pressure control portion sets a target value of the engagement pressure based on a value of the torque output from the power source.

9. A method of controlling a vehicle that includes a power source, and an automatic transmission connected to the power source, in which a gear is selected from among a plurality of gears with different gear ratios by selectively engaging a plurality of friction engagement elements, the method comprising:

controlling torque output from the power source so that the torque output from the power source increases to a first predetermined value during a torque phase when the automatic transmission upshifts;

controlling an engagement pressure for a friction engagement element to be engaged when the automatic transmission upshifts so that the engagement pressure increases to a standby pressure at which an inertia phase does not start on a condition that the torque output from the power source is equal to the first predetermined value, and then the engagement pressure is maintained at the standby pressure; and controlling the torque output from the power source according to a first torque decrease control so that the torque output from the power source gradually decreases from the first predetermined value after the engagement pressure for the friction engagement element is maintained at the standby pressure.

10. The method for controlling the vehicle according to claim 9, further comprising:

determining whether the inertia phase has started;

stopping controlling the torque output from the power source according the first torque decrease control, and controlling the torque output from the power source according to a second torque decrease control so that the torque output from the power source decreases to a second predetermined value that is lower than a driver-requested torque, when it is determined that the inertia phase has started; and gradually increasing the engagement pressure.

11. A control apparatus for a vehicle that includes a power source, and an automatic transmission connected to the power source, in which a gear is selected from among a plurality of gears with different gear ratios by selectively engaging a plurality of friction engagement elements, the control apparatus comprising:

first control means for controlling torque output from the power source so that the torque output from the power source increases to a first predetermined value during a torque phase when the automatic transmission upshifts;

second control means for controlling an engagement pressure for a friction engagement element to be engaged when the automatic transmission upshifts so that the engagement pressure increases to a standby pressure at which an inertia phase does not start on a condition that the torque output from the power source is equal to the first predetermined value, and then the engagement pressure is maintained at the standby pressure; and third control means for controlling the torque output from the power source so that the torque output from the power source gradually decreases from the first predetermined value after the engagement pressure for the friction engagement element is maintained at the standby pressure.

* * * * *